US011108902B2

(12) United States Patent
Zeng

(10) Patent No.: US 11,108,902 B2
(45) Date of Patent: Aug. 31, 2021

(54) CAMERA ASSEMBLY AND TERMINAL

(71) Applicant: GUANGDONG OPPO MOBILE TELECOMMUNICATIONS CORP., LTD., Guangdong (CN)

(72) Inventor: Yuanqing Zeng, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/847,578

(22) Filed: Apr. 13, 2020

(65) Prior Publication Data

US 2020/0244786 A1 Jul. 30, 2020

Related U.S. Application Data

(63) Continuation of application No. PCT/CN2018/115429, filed on Nov. 14, 2018.

(30) Foreign Application Priority Data

Nov. 17, 2017 (CN) .......................... 201711144628.9

(51) Int. Cl.
*H04M 1/00* (2006.01)
*H04M 1/02* (2006.01)
*H04N 5/225* (2006.01)

(52) U.S. Cl.
CPC ........ *H04M 1/0264* (2013.01); *H04N 5/2252* (2013.01); *H04N 5/2253* (2013.01); *H04N 5/2254* (2013.01); *H04N 5/2257* (2013.01)

(58) Field of Classification Search
CPC ............ H04M 1/0264; H04M 1/0235; H04M 1/0202; H04M 1/0266; H04M 1/0268;
(Continued)

(56) References Cited

U.S. PATENT DOCUMENTS 10,812,698 B1* 10/2020 Zhou .................... G03B 17/561
2011/0013295 A1* 1/2011 Chou .................... G02B 7/021
359/819
(Continued)

FOREIGN PATENT DOCUMENTS

CN 101866040 10/2010
CN 104618542 5/2015
(Continued)

OTHER PUBLICATIONS

SIPO, First Office Action for CN Application No. 201711144628.9, dated Nov. 5, 2019.
EPO, Partial Supplementary European Search Report for EP Application No. 18877702.3, dated Aug. 25, 2020.
(Continued)

*Primary Examiner* — Kathy W Wang-Hurst
*Assistant Examiner* — Max Mathew
(74) *Attorney, Agent, or Firm* — Hodgson Russ LLP

(57) ABSTRACT

A camera assembly and a terminal are provided. The camera assembly includes a base body having a receiving cavity, a driving component and a sliding body received in the receiving cavity, and a camera module. The driving component is configured to drive the sliding body moving relative to the base body, to enable the sliding body to extend out of or retract into the receiving cavity. The sliding body includes a base member and a cover plate. The cover plate covers the base member and is engaged with the base member to define a component space for receiving the camera module. The cover plate has a through hole in communication with the component space. The camera module includes a voice coil motor and a lens facing the through hole. The voice coil motor drives the lens to extend out of or retract into the sliding body through the through hole.

18 Claims, 13 Drawing Sheets

(58) Field of Classification Search
CPC ............... H04N 5/2253; H04N 5/2257; H04N 5/2254; H04N 5/2252; H04N 5/22541; H04N 5/2258; H04N 5/2259; H02K 41/0356; G02B 7/08; G03B 11/043; G06F 1/1624
USPC ...................................................... 455/556.1
See application file for complete search history.

(56) References Cited

U.S. PATENT DOCUMENTS

| | | | | |
|---|---|---|---|---|
| 2012/0229690 | A1* | 9/2012 | Wang | H04N 5/2254 |
| | | | | 348/340 |
| 2013/0044382 | A1* | 2/2013 | Phoon | H04N 5/2254 |
| | | | | 359/824 |
| 2013/0128107 | A1 | 5/2013 | Ku | |
| 2013/0148011 | A1* | 6/2013 | Chou | H02K 41/0356 |
| | | | | 348/357 |
| 2013/0258102 | A1* | 10/2013 | Chen | H04N 5/23206 |
| | | | | 348/143 |
| 2015/0358528 | A1 | 12/2015 | Brodie et al. | |
| 2016/0381346 | A1* | 12/2016 | Hsu | H04N 13/296 |
| | | | | 348/47 |
| 2019/0163242 | A1* | 5/2019 | Zeng | G06F 1/1686 |
| 2020/0204740 | A1* | 6/2020 | Tallaron | G02B 7/09 |

FOREIGN PATENT DOCUMENTS

| | | | |
|---|---|---|---|
| CN | 105187700 | 12/2015 | |
| CN | 103533222 | 8/2016 | |
| CN | 106899721 | 6/2017 | |
| CN | 107071242 | 8/2017 | |
| CN | 107197133 | 9/2017 | |
| EP | 3139584 | 3/2017 | |
| EP | 3396933 | 10/2018 | |
| EP | 3396933 A1 * | 10/2018 | ............ H04M 1/02 |
| EP | 3657771 | 5/2020 | |

OTHER PUBLICATIONS

WIPO, ISR for PCT/CN2018/115429, Feb. 3, 2019.
EPO, Extended European Search Report for EP Application No. 18877702.3, dated Nov. 25, 2020.
IPI, Office Action for IN Application No. 202017016027, dated Mar. 17, 2021.

* cited by examiner

CAMERA ASSEMBLY AND TERMINAL

CROSS-REFERENCE TO RELATED APPLICATIONS

The present application is a continuation of International Application No. PCT/CN2018/115429, filed Nov. 14, 2018, which claims priority to Chinese Patent Application No. 201711144628.9, filed Nov. 17, 2017, the entire disclosures of which are hereby incorporated by reference in their entireties.

TECHNICAL FIELD

The present disclosure relates to the technology field of electronic devices, and more particularly to a camera assembly and a terminal.

BACKGROUND

At present, various functional components of mobile phones provide users with various use functions. However, the functional components of the mobile phones increase the use volume of the mobile phones, causing problems such as inconvenience in carrying or holding, which reduces user experience.

SUMMARY

The present disclosure provides a camera assembly and a terminal.

The present disclosure provides a camera assembly which includes a base body, a driving component, a sliding body, and a camera module. The base body is provided with a receiving cavity, and the driving component and the sliding body are received in the receiving cavity. The driving component is configured to drive the sliding body moving relative to the base body, to enable the sliding body to extend out of or retract into the receiving cavity. The sliding body includes a base member and a cover plate, where the cover plate covers the base member and is engaged with the base member to define a component space. The cover plate is provided with a through hole communicating with the component space, and the camera module is received in the component space. The camera module includes a voice coil motor and a lens, where the lens faces the through hole. The voice coil motor is configured to drive the lens to extend out of or retract into the sliding body through the through hole.

The present disclosure further provides a terminal which includes the camera assembly described above.

BRIEF DESCRIPTION OF THE DRAWINGS

To describe the technical solutions of the present disclosure more clearly, the accompanying drawings required for describing the implementations are briefly introduced below. Obviously, the accompanying drawings described below are merely some implementations of the present disclosure. For those skilled in the art, other drawings can also be obtained from the drawings without paying creative work.

DETAILED DESCRIPTION

Figure 1:
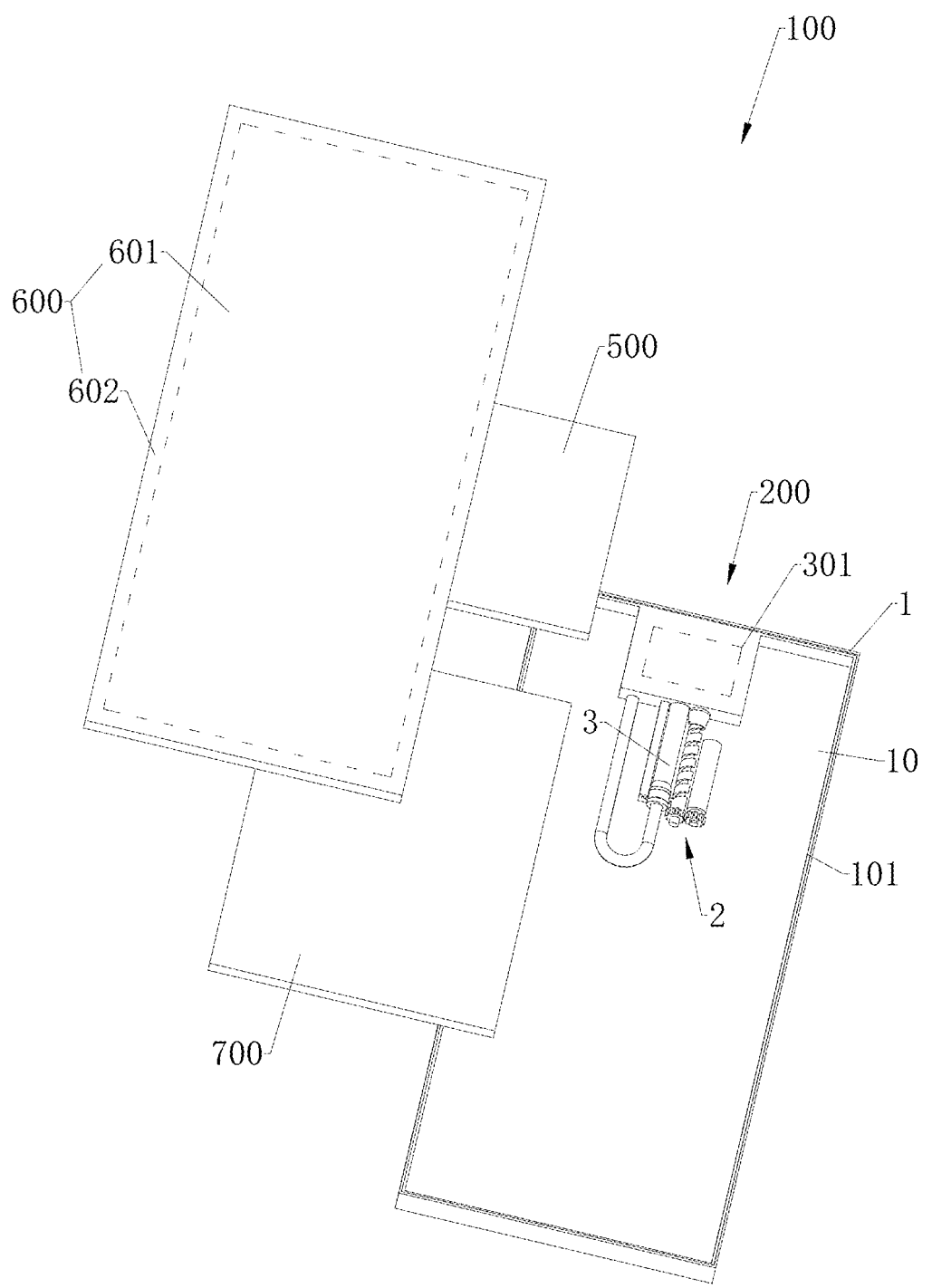
FIG. 1 is an exploded structural diagram of a terminal according to an implementation of the present disclosure.

The technical solutions in the implementations of the present disclosure will be clearly and completely described below with reference to the accompanying drawings in the implementations of the present disclosure. Obviously, the described implementations are only a part of the implementations of the present disclosure, but not all of the implementations. Based on the implementations in the present disclosure, all other implementations obtained by those of ordinary skill ordinary skill in the art without paying any creative labor are within the protection scope of the present disclosure.

In addition, the descriptions of the following implementations are made with reference to additional illustrations to illustrate specific implementations that can be implemented by the present disclosure. The directional terms mentioned in the present disclosure, for example, "up", "down", "front", "rear", "left", "right", "inside", "outside", "side", etc., refer to directions relative to the accompanying drawings. Therefore, the directional terms used are to better and more clearly explain and understand the present disclosure, rather than to indicate or imply that the device or element referred to must have a specific orientation, be constructed and operated in a specific orientation, so it cannot to be construed as limitations on the present disclosure.

In the description of the present disclosure, it should be noted that the terms "installation", "connected", "coupled", "set on/arranged" should be understood in a broad sense unless otherwise specified and limited. For example, it may be a fixed connection, a detachable connection, or an integral connection. It can be a mechanical connection. It can be a direct connection, an indirect connection through an intermediate medium, or an internal connection of two elements. For those of ordinary skill in the art, the specific meanings of the above terms in the present disclosure can be understood according to specific situations.

In addition, in the description of the present disclosure, unless otherwise stated, "a plurality of" means two or more. If the term "process" appears in this specification, it means not only an independent process, but when it cannot be clearly distinguished from other processes, it is also included in the term as long as the intended function of the process can be achieved. In addition, the numerical range indicated by "~" in this specification refers to a range which includes numerical values described before and after "~" as a minimum value and a maximum value, respectively. In the accompanying drawings, similar or identical units are denoted by the same reference numerals.

In the description of the implementations of the present disclosure, it should be understood that the orientation or position relationship indicated by the terms "thickness" and the like is based on the orientation or position relationship illustrated in the accompanying drawings, and is only for the convenience of describing the present disclosure and simplifying the description, rather than implying or indicating that the device or element referred to must have a specific orientation, be constructed and operate in a specific orientation, so it cannot be understood as a limitation on the present disclosure.

In an implementation, the present disclosure provides a camera assembly which includes a base body, a driving component, a sliding body, and a camera module. The base body is provided with a receiving cavity, and the driving component and the sliding body are received in the receiving cavity. The driving component is configured to drive the sliding body moving relative to the base body, to enable the sliding body to extend out of or retract into the receiving cavity. The sliding body includes a base member and a cover plate, where the cover plate covers the base member and is engaged with the base member to define a component space. The cover plate is provided with a through hole communicating with the component space, and the camera module is received in the component space. The camera module includes a voice coil motor and a lens, where the lens faces the through hole. The voice coil motor is configured to drive the lens to extend out of or retract into the sliding body through the through hole.

In another implementation, the present disclosure further provides a terminal which includes the camera assembly described above.

Referring to FIG. 1, an implementation of the present disclosure provides a terminal 100. The terminal 100 includes a camera assembly 200. The terminal 100 according to the implementation of the present disclosure may be any device capable of communication and storage functions, for example, a smart device capable of network capabilities, such as a tablet computer, a mobile phone, an e-reader, a remote controller, a personal computer (PC), a notebook computer, a vehicle-mounted device, an internet TV, a wearable device, and the like.

Figure 2:
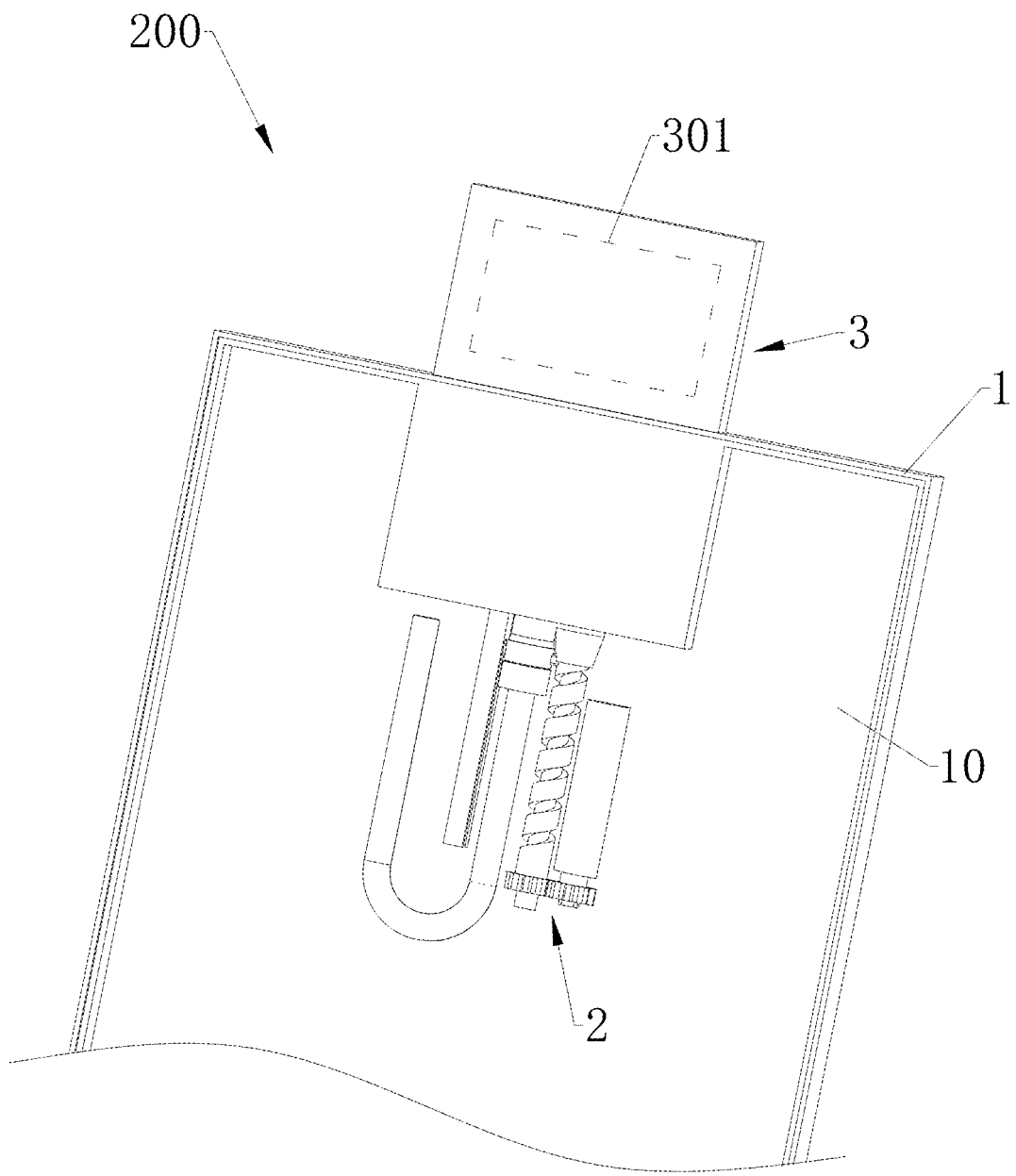
FIG. 2 is a structural diagram of a camera assembly of the terminal illustrated in FIG. 1 according to an implementation of the present disclosure.

Referring to FIG. 1 and FIG. 2, the camera assembly 200 includes a base body 1, a driving component 2, a sliding body 3, and a camera module 301. The base body 1 is provided with a receiving cavity 10. The driving component 2 and the sliding body 3 are received in the receiving cavity 10. The driving component 2 is configured to drive the sliding body 3 moving relative to the base body 1, so as to enable the sliding body 3 to extend out of or retract into the receiving cavity 10.

In the implementation, the camera module 301 is received in the sliding body 3. Since the sliding body 3 can move relative to the base body 1, when the sliding body 3 extends out of the receiving cavity 10, the camera module 301 received in the sliding body 3 can interact with a user. When the sliding body 3 retracts into the receiving cavity 10, the use volume of the terminal 100 is reduced, so as to make it convenient for the user to carry the terminal 100, thereby improving the user experience.

Figure 3:
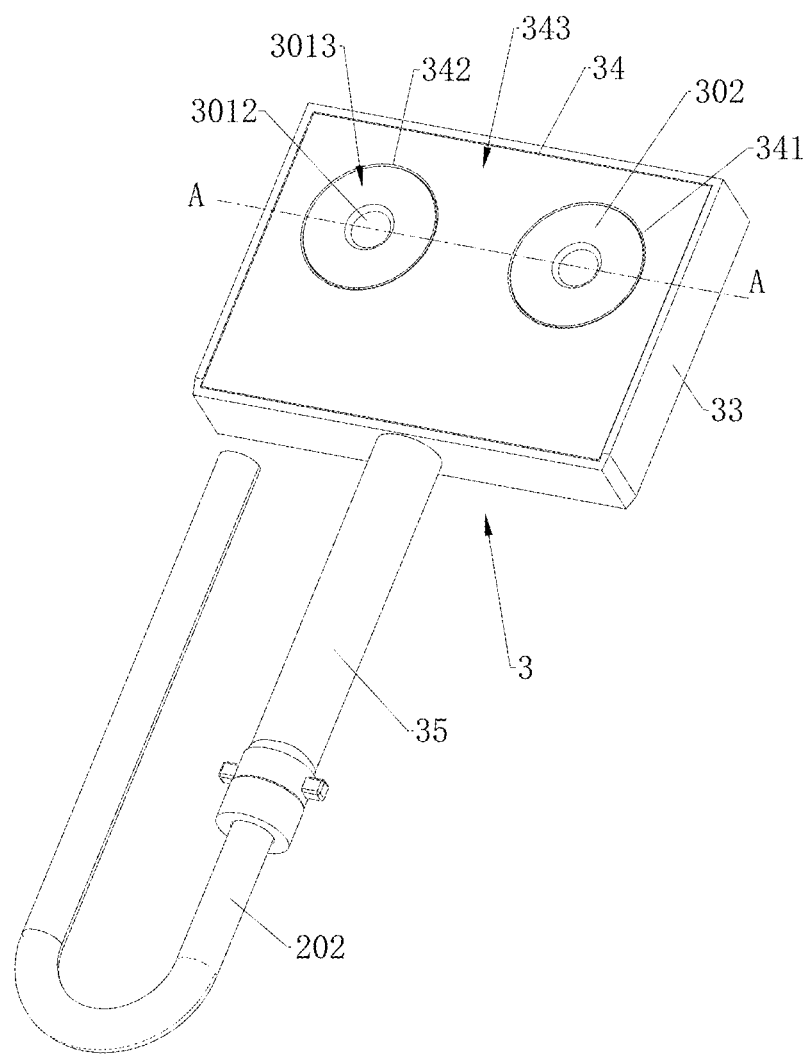
FIG. 3 is a first schematic diagram of cooperation between a camera module and a sliding body of the camera assembly illustrated in FIG. 2.
Figure 4:
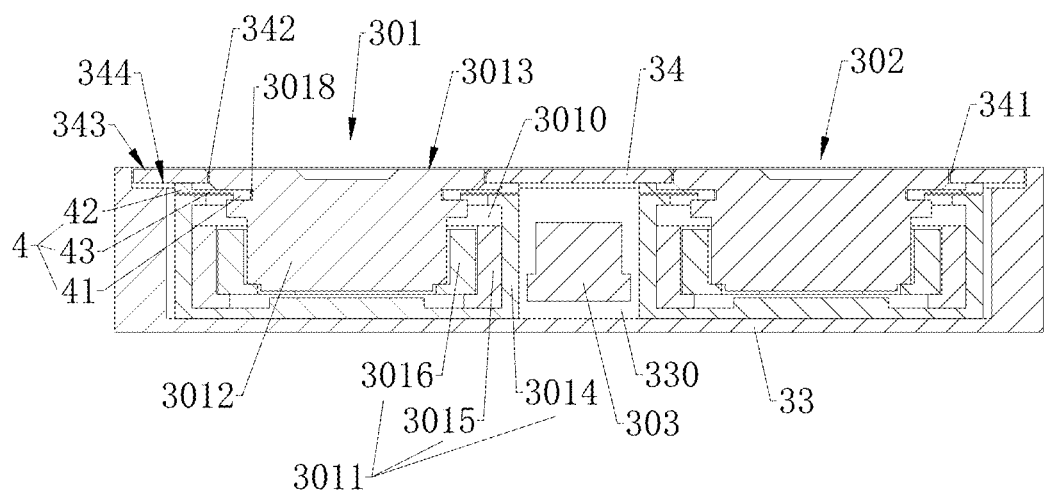
FIG. 4 is a structural diagram along a line A-A illustrated in FIG. 3.
Figure 5:
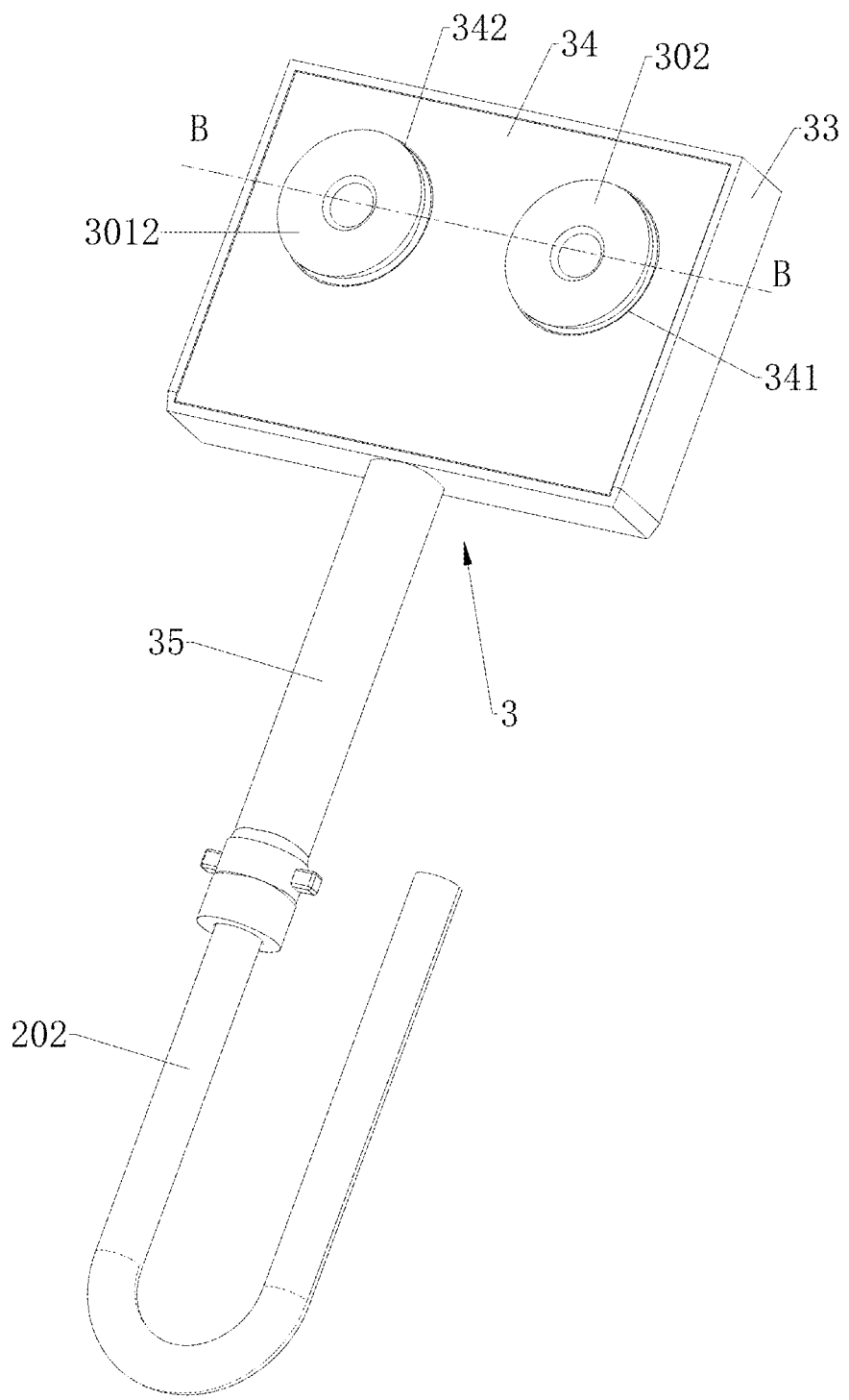
FIG. 5 is a second schematic diagram of cooperation between the camera module and the sliding body of the camera assembly illustrated in FIG. 2.
Figure 6:
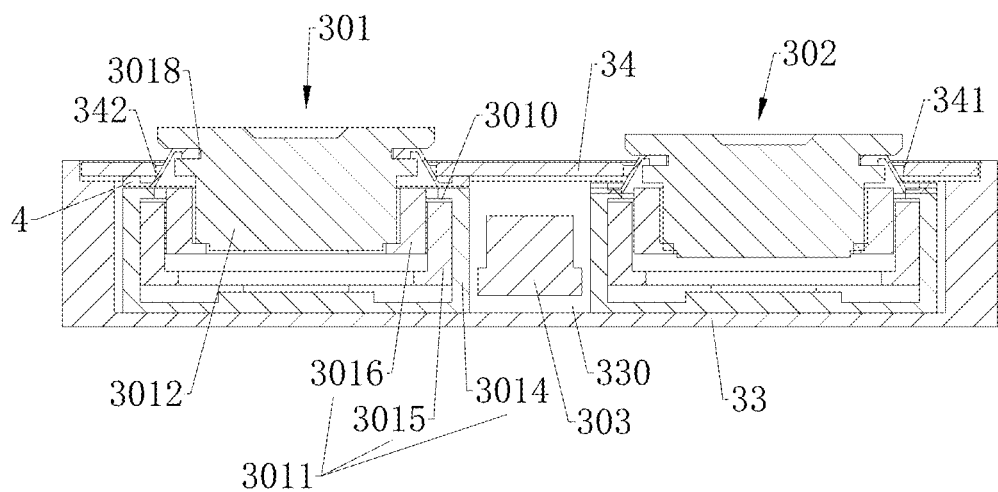
FIG. 6 is a structural diagram along a line B-B illustrated in FIG. 5.

Referring to FIG. 3 to FIG. 7, the sliding body 3 includes a base member 33 and a cover plate 34. The cover plate 34 covers the base member 33, so as to be engaged with the base member 33 to define a component space 330. The cover plate 34 is provided with a through hole 342 communicating with the component space 330. The camera module 301 is received in the component space 330. The camera module 301 includes a voice coil motor 3011 and a lens 3012. The lens 3012 faces the through hole 342. The voice coil motor 3011 is configured to drive the lens 3012 to extend out of or retract into the sliding body 3 through the through hole 342. In other words, as illustrated in FIG. 3 and FIG. 4, when the camera module 301 is not in a working status, the lens 3012 can completely retract into the sliding body 3, so as to reduce the thickness of the sliding body 3. As illustrated in FIG. 5 and FIG. 6, when the camera module 301 is in a working status, the lens 3012 partially extends out of the sliding body 3 to realize focusing, then shooting can be realized by the camera module 301.

In the implementation, since the lens 3012 is able to extend out of or retract into the sliding body 3, therefore, it can reduce the thickness of the sliding body 3 in case of shooting requirements being met, so that it is beneficial to the thinning of the camera assembly 200 and the terminal 100, and further improves the user experience.

Figure 8:
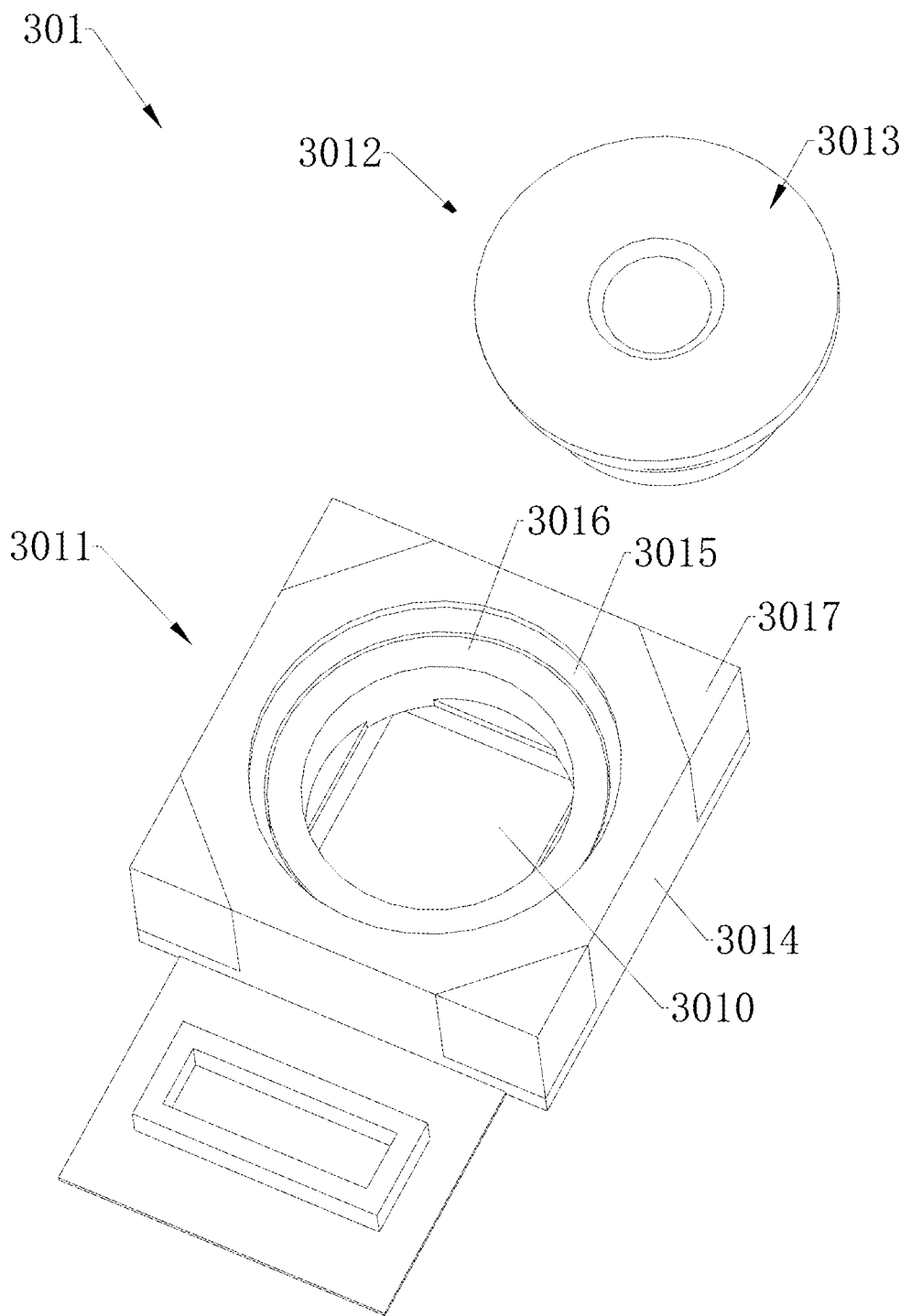
FIG. 8 is an exploded structure diagram of the camera module illustrated in FIG. 7.

In one implementation, referring to FIG. 3, FIG. 4, and FIG. 8 together, when the lens 3012 retracts into the sliding body 3, a top surface 3013 of the lens 3012 away from the base member 33 is flush with a top surface 343 of the cover plate the 34 away from the base member 33. With such a structure, the camera module 301 can further utilize the thickness space of the sliding body 3, and the thickness of the sliding body 3 can be further reduced.

In one implementation, please refer to FIG. 4, FIG. 6 and FIG. 8 together, the voice coil motor 3011 includes a motor case 3014, a first coil 3015, a second coil 3016, and a magnetic component 3017. The motor case 3014 defines a receiving space 3010. The first coil 3015, the second coil 3016, and the lens 3012 are received in the receiving space 3010. The second coil 3016 is arranged inside the first coil 3015. The magnetic component 3017 is fixed on an outer side wall of the motor case 3014, so as to form a magnetic field covering the receiving space 3010. For example, the magnetic component 3017 includes a plurality of magnetic blocks that are respectively arranged at four corners of the motor case 3014. The second coil 3016 is wound around an outer side wall of the lens 3012. The first coil 3015 and the second coil 3016 cooperate with each other in the magnetic field, so that the lens 3012 has a greater sliding stroke to meet higher shooting requirements.

In one implementation, referring to FIG. 3 to FIG. 7 together, in a direction perpendicular to an optical axis, the aperture of the through hole 342 is greater than an outer diameter of the lens 3012. With such a structure, a gap is defined between the hole wall of the through hole 342 and the outer side wall of the lens 3012, so that the lens 3012 is capable of passing through the through hole 342 and sliding relative to the cover plate 34.

In one implementation, referring to FIG. 3 to FIG. 7 and FIG. 9 together, the camera assembly 200 further includes a sealing ring 4. The sealing ring 4 is made of flexible materials, and thus has deformation ability. The sealing ring 4 includes an inner peripheral portion 41 and an outer peripheral portion 42 opposite to each other. The inner peripheral portion 41 rests against the lens 3012, and the outer peripheral portion 42 rests against the cover plate 34.

In the implementation, the sealing ring 4 can cover the gap between the hole wall of the through hole 342 and the outer side wall of the lens 3012, which enables the camera assembly 200 have a sealing ability. The inner peripheral portion 41 of the sealing ring 4 can move with the lens 3012, so as to ensure the sealing ability of the camera assembly 200 in various use environments and states.

In one implementation, referring to FIG. 4 and FIG. 6 together, the outer side wall of the lens 3012 is provided with an annular groove 3018, and the inner peripheral portion 41 is clamped into the annular groove 3018. The inner peripheral portion 41 may be fixed in the annular groove 3018 by adhesive materials. With such a structure, the inner peripheral portion 41 multiplexes space with the lens 3012, which can improve space utilization and reduce the volume of the camera assembly 200. At the same time, the connection firmness between the sealing ring 4 and the lens 3012 can also be improved.

In one implementation, referring to FIG. 4 and FIG. 6 together, the cover plate 34 has a bottom surface 344 facing the component space 330. The bottom surface 344 of the cover plate 34 is opposite to the top surface 343 of the cover plate 34. The outer peripheral portion 42 is tightly pressed between the voice coil motor 3011 and the bottom surface 344 of the cover plate 34. With such a structure, not only the outer peripheral portion 42 can firmly resist against the cover plate 34 to ensure the sealing ability, but also can improve the space utilization of the component space 330, so as to further reduce the thickness of the sliding body 3. In one implementation, the outer peripheral portion 42 is fixed to the voice coil motor 3011, and the sealing ring 4 and the camera module 301 form an integrated component. After the integrated component is placed in the component space 330, the cover plate 34 is pressed against the outer peripheral portion 42 to complete the assembly.

Figure 9:
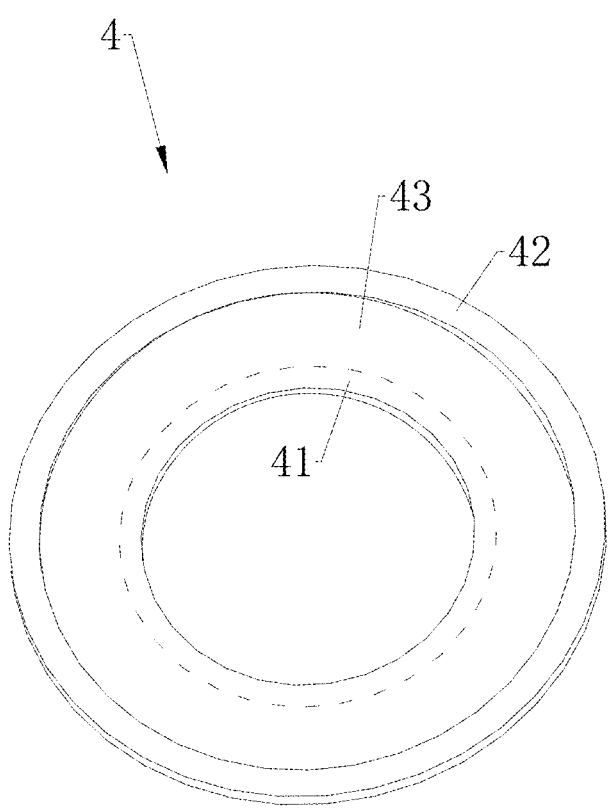
FIG. 9 is a structural diagram of a sealing ring illustrated in FIG. 7.

In one implementation, referring to FIG. 4, FIG. 6, and FIG. 9 together, the sealing ring 4 further includes a transition portion 43 connected between the inner peripheral portion 41 and the outer peripheral portion 42. In the optical axis direction of the lens 3012, the thickness of the transition portion 43 is less than that of the inner peripheral portion 41 and the outer peripheral portion 42.

In the implementation, the thickness of the inner peripheral portion 41 and the outer peripheral portion 42 are greater, so that they can be better fixed to the lens 3012 and the cover plate 34, to ensure sealing reliability. The thickness of the transition portion 43 is smaller, thereby reducing the force required for deformation, so as to reduce the force for driving the lens 3012, and then reduce the power consumption of the camera assembly 200. It can be understood that the resistance caused by the deformation of the transition portion 43 also helps the lens 3012 to slide smoothly.

Figure 10:
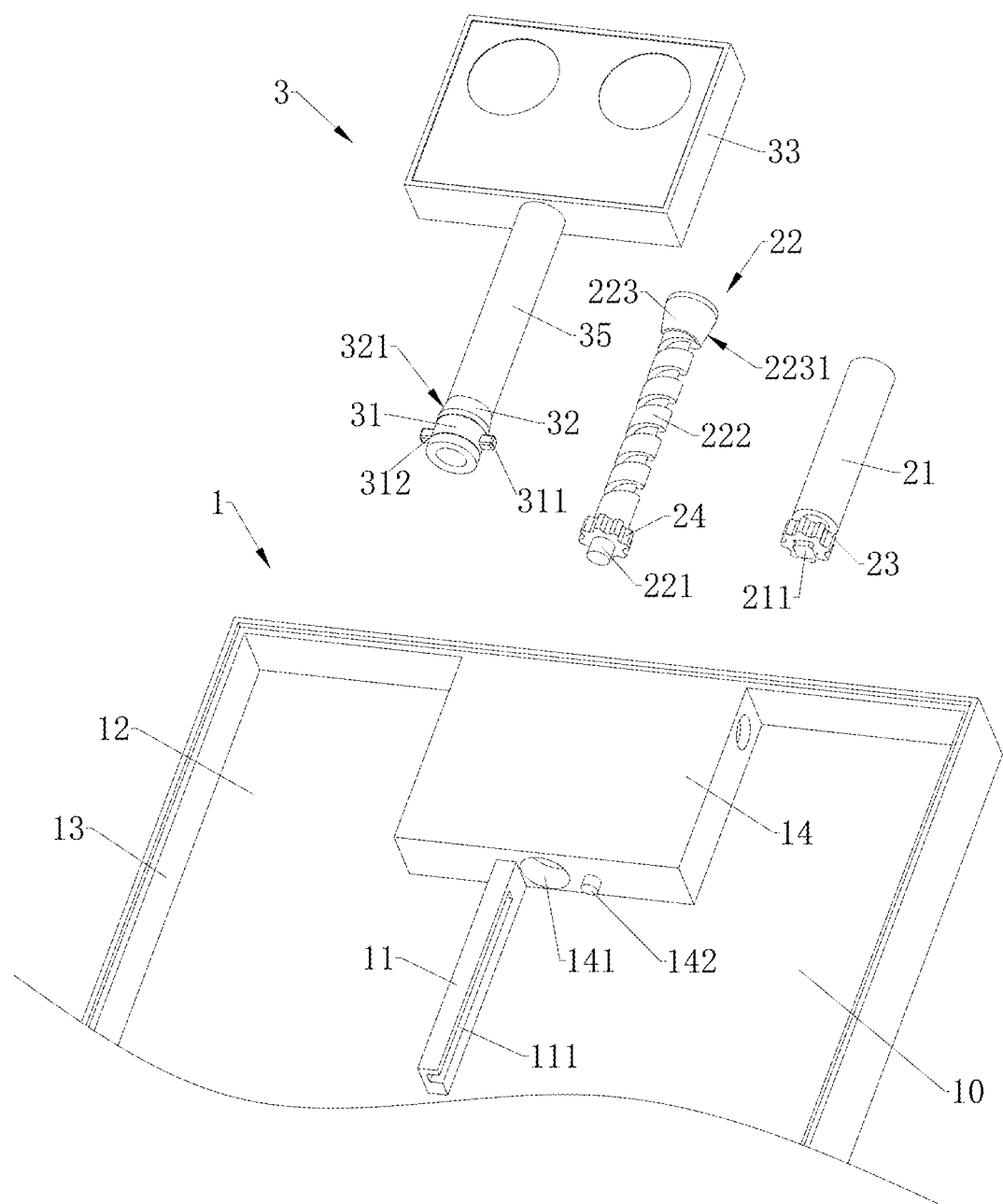
FIG. 10 is an exploded structure diagram of a partial structure of the camera assembly illustrated in FIG. 2.

In one implementation, referring to FIG. 1, FIG. 2, and FIG. 10 together, the driving component 2 includes a motor 21 and a leading screw 22. The leading screw 22 includes a connecting portion 221, a main body portion 222, and a first rotating portion 223 that are fixedly connected in order. The connecting portion 221 is connected to a rotating shaft 211 of the motor 21, and is driven rotating by the rotating shaft 211 of the motor 21.

The sliding body 3 is slidably connected to the base body 1. The sliding body 3 further includes a sliding portion 31, a second rotating portion 32, and a connecting rod 35. One end of the connecting rod 35 is fixedly connected to the base member 33. The sliding portion 31 and the second rotating portion 32 are arranged on the other end of the connecting rod 35. The connecting rod 35 is a round rod. The sliding portion 31 is sleeved on an outer side of the connecting rod 35 and is capable of rotating relative to the connecting rod 35. The second rotating portion 32 is fixed on the outer side of the connecting rod 35, and the connecting rod 35 is able to rotate with the second rotating portion 32. The second rotating portion 32 can also be formed integrally with the connecting rod 35. The second rotating portion 32 is arranged close to the sliding portion 31, and between the base member 33 and the sliding portion 31. The sliding portion 31 cooperates with the main body portion 222. When the main body portion 222 rotates, it drives the sliding portion 31 moving. When the motor 21 drives the leading screw 22 to rotate, the main body portion 222 drives, through the sliding portion 31, the sliding body 3 to slide, so as to enable the base member 33 to extend out of the receiving cavity 10, and the second rotating portion 32 cooperate with the first rotating portion 223, therefore the first rotating portion 223 drives the second rotating portion 32 to rotate, so as to enable the base member 33 to rotate outside the receiving cavity 10.

Specifically, when the camera module 301 is in use, when the motor 21 drives the leading screw 22 to rotate in a first direction, the main body portion 222 rotates, and drives, through the sliding portion 31, the sliding body 3 to slide, to enable the base member 33 to extend out of the receiving cavity 10, so as to enable the camera module 301 received in the base member 33 to interact with the user for shooting. While the base member 33 extends out of the receiving cavity 10, the second rotating portion 32 approaches the first rotating portion 223 until the second rotating portion 32 cooperates with the first rotating portion 223. When the motor 21 continues driving the leading screw 22 to rotate in the first direction, the first rotating portion 223 rotates and drives the second rotating portion 32 to rotate, to enable the base member 33 to rotate outside the receiving cavity 10 relative to the base body 1, and the camera module 301 rotates with the base member 33, so as to enable the camera module 301 to interact with the user at various angles, which improves the user experience. When the camera module 301 is not in use, the motor 21 drives the leading screw 22 to rotate in a second direction, so that the base member 33 rotates to an angle capable of being received in the receiving cavity 10. Then, the motor 21 drives the leading screw 22 to continue rotating in the second direction, and the main body portion 222 drives the sliding body 3 to slide, so that the base member 33 is received in the receiving cavity 10, thereby reducing the use volume of the terminal 100, and it is convenient for the user to carry the terminal 100, which can further improve the user experience.

In the implementation, since the sliding body 3 can move relative to the base body 1, when the base member 33 extends out of the receiving cavity 10, the camera module 301 received in the base member 33 is able to interact with the user. When the base member 33 is received in the receiving cavity 10, the use volume of the terminal 100 is reduced, and it is convenient for the user to carry the terminal 100. Therefore, the camera assembly 200 can improve the user experience. In addition, since the base member 33 is able to rotate after extending out of the receiving cavity 10, thus the camera module 301 is able to interact with the user at various angles, which further improves the user experience.

In one implementation, as illustrated in FIG. 1, the terminal 100 further includes a battery 700, a motherboard 500, and the like housed in the receiving cavity 10. The battery 700 is electrically coupled to the motherboard 500.

In one implementation, referring to FIG. 3 to FIG. 7 together, the terminal 100 further includes functional components housed in the component space 330. The functional components may be any one or more combinations of devices such as a camera module 302, an iris recognition module, a face recognition module, a flash 303, a microphone, a receiver, a photoreceptor, a fingerprint module, and a button.

In one implementation, the motor 21 may be a stepping motor or other servo motor capable of precise control, so the motor 21 can accurately control, through the leading screw 22, the moving stroke of the sliding body 3, to make the use experience of the terminal 100 applying the camera assembly 200 better and the reliability higher. The motor 21 is fixed on the base body 1. An extending direction of the leading screw 22 is consistent with the sliding direction of the sliding body 3.

Figure 11:
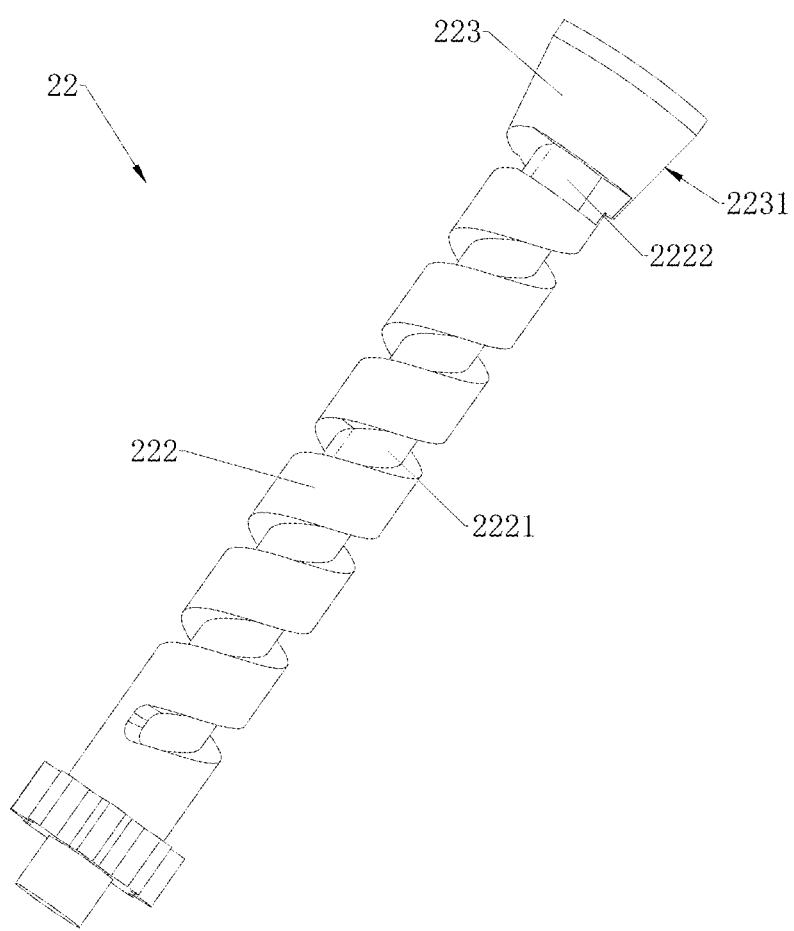
FIG. 11 is a structural diagram of a leading screw illustrated in FIG. 10.

In one implementation, referring to FIG. 10 and FIG. 11 together, a first gear 23 is sleeved on the rotating shaft 211 of the motor 21, a second gear 24 is sleeved on the connecting portion 221, and the second gear 24 meshes with the first gear 23. With such a structure, the motor 21 is arranged side by side with the leading screw 22 to save space occupied by the driving component 2. In one implementation, the rotating shaft 211 of the motor 21 may be directly connected to the connecting portion 221 of the leading screw 22, to enable the leading screw 22 to rotate with the rotating shaft 211 of the motor 21.

In one implementation, there are multiple ways for the sliding portion 31 to cooperate with the main body portion 222, which are described as follows.

Figure 7:
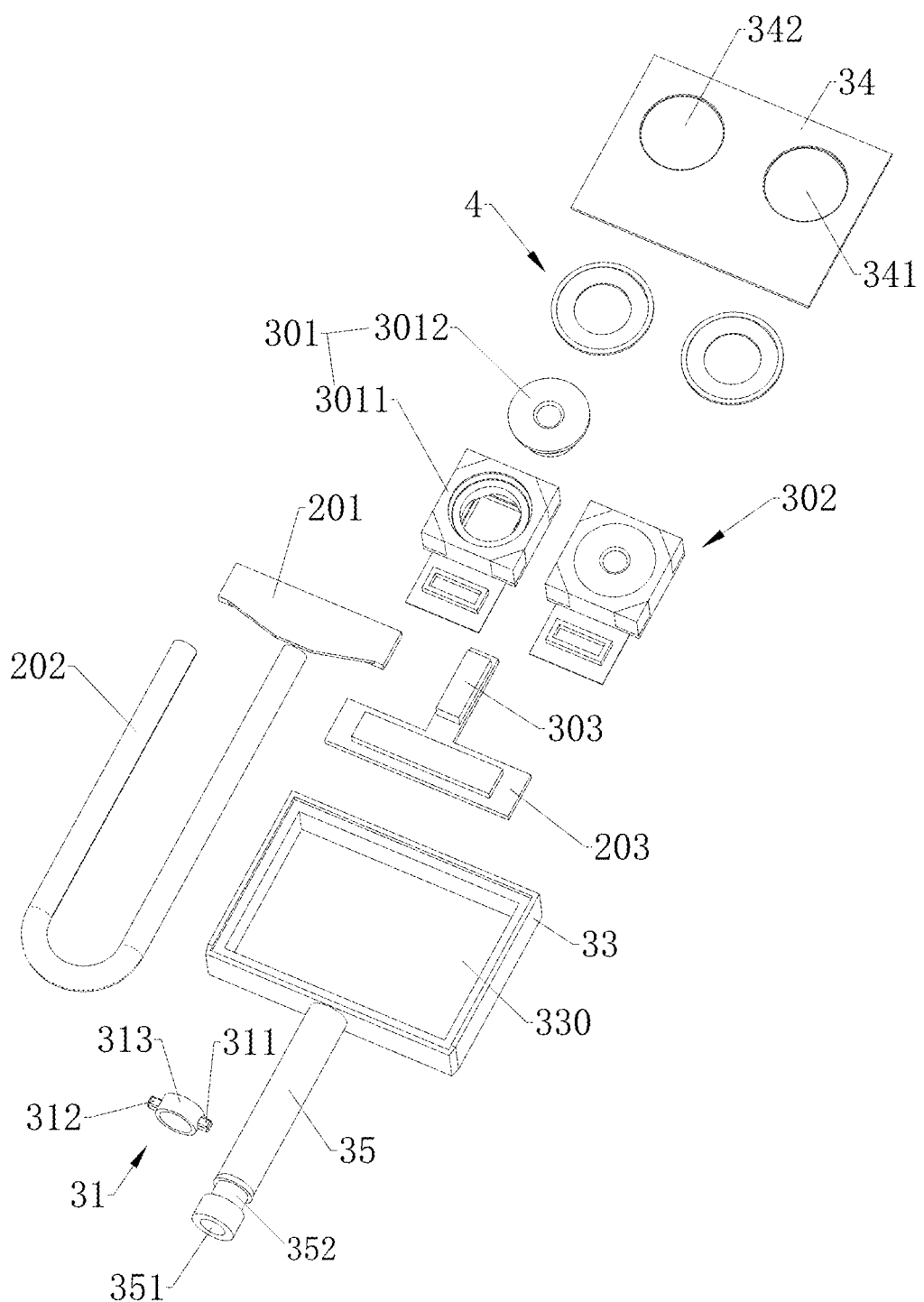
FIG. 7 is a partially exploded structure diagram of the structure illustrated in FIG. 3.

In one implementation, referring to FIG. 7, FIG. 10, and FIG. 11 together, the sliding portion 31 includes a sliding block 311. The main body portion 222 is provided with a spiral groove 2221. The sliding block 311 is snapped into the spiral groove 2221, and slides along the spiral groove 2221. When the main body portion 222 rotates, the spiral groove 2221 rotates with the main body portion 222, thereby driving, through sliding block 311, the sliding body 3 to slide.

The main body portion 222 is further provided with an arc-shaped groove 2222 communicating with an end of the spiral groove 2221 facing the first rotating portion 223. The arc-shaped groove 2222 communicates with the spiral groove 2221. An extending direction of the arc-shaped groove 2222 is perpendicular to the sliding direction of the sliding body 3. After the sliding block 311 slides into the arc-shaped groove 2222 from the spiral groove 2221, when the arc-shaped groove 2222 rotates with the main body portion 222, the sliding block 311 slides in the arc-shaped groove 2222, to enable the sliding body 3 to stay in place. In other words, the arc-shaped groove 2222 is an idling area. With such a structure, the first rotating portion 223 that rotates together with the main body portion 222 drives the second rotating portion 32 to rotate, so that the sliding body 3 rotates at the same position.

The base body 1 includes a limiting portion 11 received in the receiving cavity 10. The limiting portion 11 is provided with a sliding groove 111. The sliding portion 31 further includes a limiting block 312 slidably received in the sliding groove 111. An extending direction of the sliding groove 111 is consistent with the sliding direction of the sliding body 3. Under the limitation of the sliding block 311 and the limiting block 312, the sliding portion 31 can slide smoothly, so as to make the sliding of the sliding body 3 steady.

The sliding portion 31 further includes a collar 313. The sliding block 311 and the limiting block 312 are fixed on an outer surface of the collar 313 and opposite to each other. The collar 313 is sleeved on the outer side of the connecting rod 35. The collar 313 is connected to the outer side of the connecting rod 35 in a gap, and the collar 313 is able to rotate relative to the connecting rod 35, so that the sliding portion 31 can rotate relative to the connecting rod 35. With such a structure, the leading screw 22 and the limiting portion 11 are respectively located on opposite sides of the connecting rod 35. The outer side of the connecting rod 35 is provided with an annular groove 352, and the collar 313 is located in the annular groove 352, so that the sliding direction of the collar 313 is limited.

Figure 12:
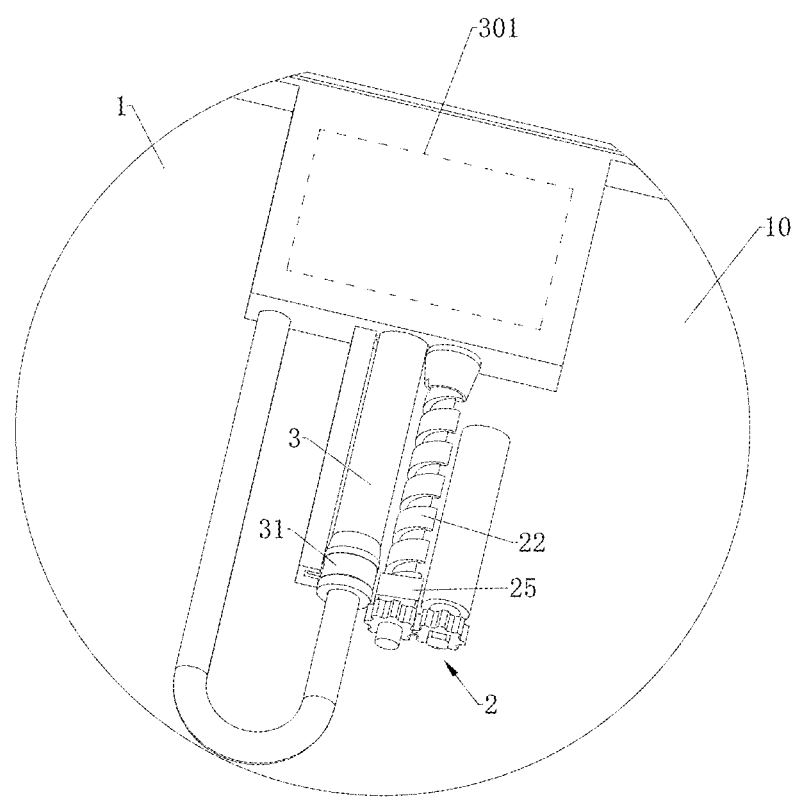
FIG. 12 is a structural diagram of the camera assembly of the terminal illustrated in FIG. 1 according to another implementation of the present disclosure.

In another implementation, referring to FIG. 12, the driving component 2 further includes a driving block 25 sleeved on the outer side of the leading screw 22. The driving block 25 is screwed to the leading screw 22. The driving block 25 is driven to move when the leading screw 22 rotates. Magnetic attraction is generated between the driving block 25 and the sliding portion 31. The sliding portion 31 is driven to move when the driving block 25 moves.

Since the driving block 25 and the sliding portion 31 of the sliding body 3 are connected to each other by magnetic attraction, so there is no rigid connection between the driving block 25 and the sliding body 3. If the camera module 301 is impacted by an impact force toward an interior of the base body 1, the sliding body 3 will quickly overcome the magnetic attraction and detaches from the driving block 25, so as to enable the sliding body 3 carrying the camera module 301 to retract into the receiving cavity 10, so the damage of the camera module 301 due to rigid impact can be avoided, so that the reliability of the terminal 100 to which the camera assembly 200 is applied is high.

Specifically, the outer surface of the leading screw 22 is provided with a spiral sliding groove. The driving block 25 is provided with a through hole, and the wall of the through hole 342 is provided with a clamping block. The driving block 25 is sleeved on the outer surface of the leading screw 22, and the clamping block is received in the spiral sliding groove to move along the spiral sliding groove. In other implementations, the outer surface of the leading screw 22 may be provided with an external thread, the wall of the through hole may be provided with an internal thread, and the internal thread is screwed with the external thread.

The driving block 25 and the sliding portion 31 are both made of permanent magnet materials, and the magnetism of the driving block 25 is opposite to that of the sliding portion 31. Magnetic attraction is generated between the driving block 25 and the sliding portion 31 with opposite magnetic properties, and the two attract each other, so that the driving block 25 and the sliding body 3 can be driven to move by moving the driving block 25. Permanent magnet materials, also known as "hard magnetic materials", refer to materials that can maintain constant magnetic properties once magnetized. Permanent magnet materials include, but are not limited to, aluminum-nickel-cobalt-based permanent magnet alloys, iron-chromium-cobalt-based permanent magnet alloys, permanent ferrites, rare earth permanent magnet materials, and composite permanent magnet materials.

The driving block 25 is made of permanent magnet materials, and the sliding portion 31 is made of ferromagnetic materials. Ferromagnetic materials include, but are not limited to, iron, cobalt, nickel, and thallium. The connecting rod 35 is made of non-ferromagnetic materials. With such a structure, magnetic attraction is generated between the driving block 25 and the sliding portion 31, and the driving block 25 attracts the sliding portion 31, so that the sliding portion 31 and the sliding body 3 can be driven to move by moving the driving block 25. The connecting rod 35 is made of non-ferromagnetic materials and is not attracted by the driving block 25, thereby avoiding interference to the magnetic attraction between the driving block 25 and the sliding portion 31, so that the driving block 25 can accurately control the movement of the sliding portion 31.

A gap is defined between the driving block 25 and the sliding portion 31. When the camera module 301 is impacted by an impact force toward the interior of the base body 1, the gap can prevent the driving block 25 from hitting the sliding portion 31, and make the sliding body 3 overcome the magnetic attraction more quickly to detach from the driving block 25, so as to enable the sliding body 3 carrying the camera module 301 to retract into the receiving cavity 10, so the damage of the camera module 301 due to rigid impact can be avoided, so that the reliability of the camera module 301 and the terminal 100 is high. Further, the gap is 1 mm or less. With such a structure, the magnetic attraction between the driving block 25 and the sliding portion 31 can ensure that the driving block 25 can smoothly move, through the sliding portion 31, the sliding body 3.

In one implementation, referring to FIG. 7, the connecting rod 35 is provided with a through hole 351. The through hole 351 extends along an axial direction of the connecting rod 35. The component space 330 is defined in the base member 33. The through hole 351 communicates with the component space 330. The camera assembly 200 further includes a circuit board 201 and a connection cable 202 electrically connected to the circuit board 201. The circuit board 201 is housed in the component space 330. The camera module 301 is electrically coupled to the circuit board 201. The connecting cable 202 extends into the receiving cavity 10 through the through hole 351, to be electrically coupled to other components (for example, the motherboard 500) arranged in the receiving cavity 10.

In one implementation, there are multiple ways for the first rotating portion 223 to cooperate with the second rotating portion 32, which are described as follows.

In one implementation, referring to FIG. 2, FIG. 10, and FIG. 11 together, the first rotating portion 223 is provided with a first friction surface 2231, and the second rotating portion 32 is provided with a second friction surface 321. When the second rotating portion 32 cooperates with the first rotating portion 223, the second friction surface 321 contacts the first friction surface 2231. Both the first friction surface 2231 and the second friction surface 321 are rough surfaces, so that sufficient static friction force can be generated between the first rotating portion 223 and the second rotating portion 32, so the second rotating portion 32 is driven by the first rotating portion 223 to rotate. The first friction surface 2231 and the second friction surface 321 may be made of silicone or rubber materials.

The first friction surface 2231 is in a shape of a side surface of a circular table. The first friction surface 2231 is formed into an annular fan shape after being unfolded. The second friction surface 321 is in a shape of a side surface of a circular table. The second friction surface 321 is formed into an annular fan shape after being unfolded. An inclination direction of the first friction surface 2231 is opposite to that of the second friction surface 321. For example, the first friction surface 2231 is inclined toward the main body portion 222, and the second friction surface 321 is inclined toward the base member 33, so that the second friction surface 321 can contact the first friction surface 2231 during the movement of the second rotating portion 32 to the first rotating portion 223. The second friction surface 321 is tangent to the first friction surface 2231, so that a contact area between the second friction surface 321 and the first friction surface 2231 is larger. When the second friction surface 321 contacts the first friction surface 2231, an interference fit is formed between the two friction surfaces 321 and 2231, to prevent the second friction surface 321 from detaching from the first friction surface 2231 in the process that the first rotating portion 223 drives the second rotating portion 32 to rotate.

Figure 13:
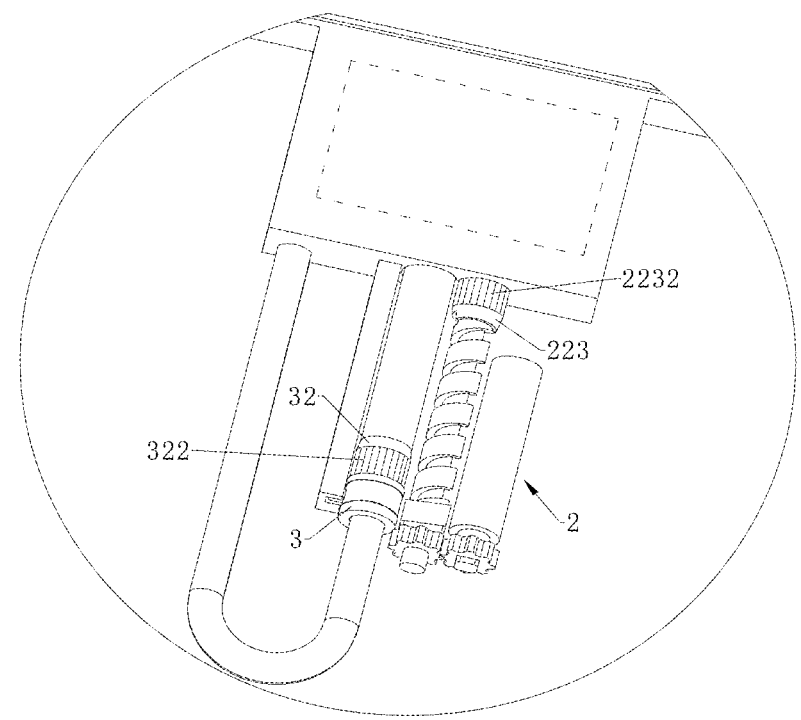
FIG. 13 is a structural diagram of the camera assembly of the terminal illustrated in FIG. 1 according to still another implementation of the present disclosure.

In another implementation, referring to FIG. 13, the first rotating portion 223 is provided with a first tooth portion 2232. The second rotating portion 32 is provided with a second tooth portion 322. The second tooth portion 322 meshes with the first tooth portion 2232 when the second rotating portion 32 cooperates with the first rotating portion 223. The second tooth portion 322 is driven to rotate when the first tooth portion 2232 rotates.

Figure 14:
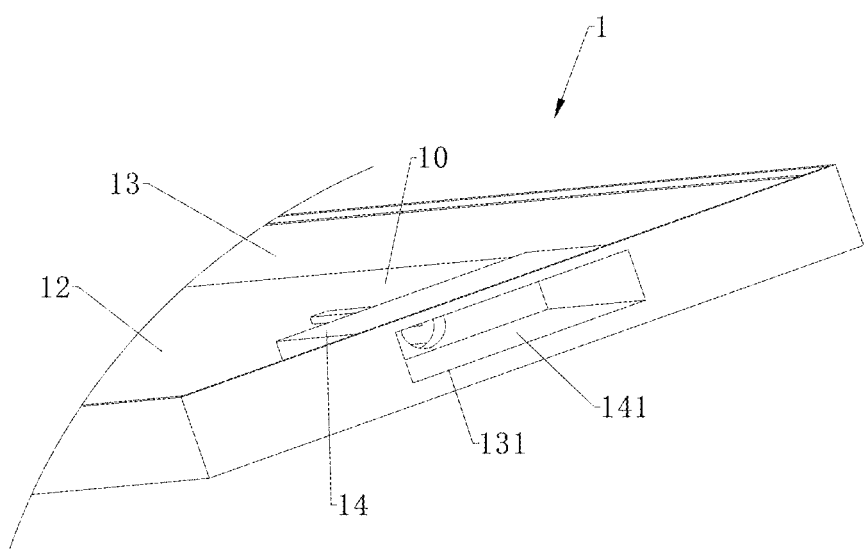
FIG. 14 is a structural diagram of a base body illustrated in FIG. 10.

In one implementation, referring to FIG. 10 and FIG. 14 together, the base body 1 includes a bottom plate 12 and a frame 13 connected to the periphery of the bottom plate 12. The frame 13 is provided with an opening 131 communicating with the receiving cavity 10. The sliding body 3 is slidably connected to the frame 13 through the opening 131, so as to enable the camera module 301 to extend out of or retract into the receiving cavity 10 through the opening 131. The opening 131 may be provided on a long side or a short side of the frame 13.

In the implementation, the bottom plate 12 may be a back cover of the terminal 100. The frame 13 may be a peripheral frame of the terminal 100. Of course, in other implementations, the bottom plate 12 may also be a middle partition plate of the terminal 100.

The bottom plate 12 of the base body 1 carries the sliding body 3 and the driving component 2, to ensure that the driving component 2 can drive the sliding body 3 to extend and retract relative to the base body 1. The motor 21 is fixed on the bottom plate 12. The extending direction of the leading screw 22 is substantially perpendicular to the side of the frame 13 where the opening 131 is provided, so as to reduce the moving stroke of the driving block 25. The frame 13 covers and hides the sliding body 3 and the driving component 2, to improve the appearance performance and security performance of the terminal 100. Since the opening 131 is provided on the frame 13, the camera module 301 extends and retracts on the side of the base body 1, that is, the camera module 301 extends and retracts on the side of the terminal 100. The camera module 301 does not occupy the front space of the terminal 100.

The outer side wall of the base member 33 of the sliding body 3 is matched with the inner side wall of the opening 131. With such a structure, the gap between the outer side wall of the base member 33 and the inner side wall of the opening 131 can ensure that the sliding body 3 can smoothly slide relative to the base body 1.

A sealing ring (not shown in the figure) is clamped on the outer side wall of the base member 33 away from the sliding portion 31. The sealing ring is sealed between the outer side wall of the base member 33 and the inner side wall of the opening 131 when the camera module 301 is received in the receiving cavity 10. The sealing ring is configured to prevent outside water vapor and dust from entering the receiving cavity 10 through the opening 131, thereby improving the reliability of the camera module 301 and the terminal 100.

In one implementation, referring to FIG. 10 and FIG. 14 together, the base body 1 further includes a guiding portion 14. The guiding portion 14 defines a guiding rail 141 in an inner of the guiding portion 14. The guiding rail 141 communicates with the opening 131 and the receiving cavity 10. The sliding body 3 is mounted in the guiding portion 14 through the guiding rail 141 to extend out of or retract into the guiding portion 14. The guiding rail 141 is configured to cooperate with the opening 131 to limit the sliding direction of the sliding body 3, thereby ensuring that the camera module 301 smoothly extends out of the receiving cavity 10 or retracts into the receiving cavity 10.

One side of the guiding portion 14 away from the opening 131 is provided with a positioning protrusion 142 that is configured to position the leading screw 22. One end surface of the first rotating portion 223 of the leading screw 22 away from the main body portion 222 is provided with a positioning groove. The positioning protrusion 142 snaps into the positioning groove to achieve positioning.

In one implementation, referring to FIG. 3 to FIG. 7 together, the cover plate 34 is provided with a signal penetrating portion 341 facing the functional components.

In the implementation, the base member 33 surrounds the functional components, so as to play a protective role. The signal penetrating portion 341 provided on the cover plate 34 can smoothly interact with the user when the functional component extends out of the receiving cavity 10.

The functional components have various combinations and arrangements, and the signal penetrating portion 341 is adapted to the functional component.

In one implementation, the functional components include a camera module 302 (also referred to as a camera module), and/or an iris recognition module, and/or a face recognition module, and/or a fingerprint recognition module, and/or a flash, and/or a photoreceptor. The signal penetrating portion 341 is a light transmitting lens or a light transmitting hole. The signal penetrating portion 341 is configured to allow light signals to pass through. For example, the functional components may be a camera module 302. The camera module 302 and the camera module 301 constitute a dual-camera shooting component to meet various shooting requirements. The signal penetrating portion 341 of the cover plate 34 is a light transmitting hole. The functional components may move relative to the cover plate 34 through the signal penetrating portion 341 to extend out of the sliding body 3 or retract into the sliding body 3.

In another implementation, the functional components include a receiver and/or a microphone, and the signal penetrating portion 341 is a perforated plate or a through hole. The signal penetrating portion 341 is configured to allow a sound signal to pass through.

In still another implementation, there are multiple functional components, and there are multiple signal penetrating portions 341. The multiple signal penetrating portions 341 face the multiple functional components in a one-to-one correspondence, and are adapted to the types of signals received or released by the multiple functional components. As illustrated in FIG. 4, FIG. 6, and FIG. 7, the functional components include a camera module 302 and a flash 303. The flash 303 is located between the camera module 301 and the camera module 302. The signal penetrating portion 341 includes a signal penetrating portion facing the camera module 302 and a signal penetrating portion facing the flash 303. The camera assembly 200 further includes a transition circuit board 203. The transition circuit board 203 includes a first surface and a second surface opposite to each other. The first surface is electrically connected to the circuit board 201. The flash 303 is fixed on the first surface and is electrically connected to the transition circuit board 203. The camera module 301 and the camera module 302 are electrically connected to the second surface. The transition circuit board 203 is substantially in a T-shaped.

In one implementation, referring to FIG. 1, the receiving cavity 10 has a receiving opening 101 perpendicular to the sliding direction of the sliding body 3. The terminal 100 further includes a display module 600. The display module 600 covers the base body 1 and covers the receiving opening 101. Since the functional components can flexibly extend out of the receiving cavity 10 or retract into the receiving cavity 10 according to use requirements, the functional components do not need to occupy the front space of the terminal 100 and does not limit the screen ratio of the display module 600, so that the screen ratio of the terminal 100 can be increased, which is beneficial to the development requirements of the full screen display of the terminal 100.

The display module 600 includes a display area 601 and a frame area 602 provided around the display area 601. A ratio of an area of the display area 601 to an area of the frame area 602 is greater than or equal to 9. In other words, the proportion of the display area 601 occupying the front area of the display module 600 is greater than or equal to 90%. The display module 600 can realize full-screen display. The frame area 602 is configured to arrange driving cables thereon, so as to make the display area 601 perform screen display. The display module 600 covers the camera assembly 200. The display area 601 covers at least a part of the camera assembly 200.

The above are the implementations of the present disclosure. It should be noted that for those of ordinary skill in the art, without departing from the principles of the implementation of the present disclosure, they can also make several improvements and retouching, which are also regarded as the protection scope of the present disclosure.

What is claimed is:
1. A camera assembly, comprising:
a base body, a driving component, a sliding body, and a camera module;
wherein the base body is provided with a receiving cavity, and the driving component and the sliding body are received in the receiving cavity;
wherein the driving component is configured to drive the sliding body to move relative to the base body, to enable the sliding body to extend out of or retract into the receiving cavity;
wherein the sliding body comprises a base member and a cover plate, wherein the cover plate covers the base member and is engaged with the base member to define a component space;
wherein the cover plate is provided with a through hole communicating with the component space, and the camera module is received in the component space;
wherein the camera module comprises a voice coil motor and a lens, wherein the lens faces the through hole, and the voice coil motor is configured to drive the lens to extend out of or retract into the sliding body through the through hole;
wherein the voice coil motor comprises a motor case, a first coil, a second coil, and a magnetic component;
wherein the motor case defines a receiving space;
wherein the first coil, the second coil, and the lens are received in the receiving space, the second coil is arranged inside the first coil, and the second coil is wound around an outer side wall of the lens;

wherein the magnetic component is fixed on an outer side wall of the motor case to form a magnetic field covering the receiving space.

2. The camera assembly of claim 1, wherein when the lens retracts into the sliding body, a top surface of the lens away from the base member is flush with a top surface of the cover plate away from the base member.

3. The camera assembly of claim 1, wherein the camera module further comprises a sealing ring, wherein the sealing ring is made of flexible materials, and the sealing ring comprises an inner peripheral portion and an outer peripheral portion opposite to each other;
wherein the inner peripheral portion rests against the lens, and the outer peripheral portion rests against the cover plate.

4. The camera assembly of claim 3, wherein an outer side wall of the lens is provided with an annular groove, and the inner peripheral portion is clamped into the annular groove.

5. The camera assembly of claim 3, wherein the cover plate has a bottom surface facing the component space, and the outer peripheral portion is pressed between the voice coil motor and the bottom surface of the cover plate.

6. The camera assembly of claim 3, wherein the sealing ring further comprises a transition portion connected between the inner peripheral portion and the outer peripheral portion, wherein a thickness of the transition portion is less than that of the inner peripheral portion and the outer peripheral portion.

7. A camera assembly, comprising: a base body, a driving component, a sliding body, and a camera module;
wherein the base body is provided with a receiving cavity, and the driving component and the sliding body are received in the receiving cavity;
wherein the driving component is configured to drive the sliding body to move relative to the base body, to enable the sliding body to extend out of or retract into the receiving cavity;
wherein the sliding body comprises a base member and a cover plate, wherein the cover plate covers the base member and is engaged with the base member to define a component space;
wherein the cover plate is provided with a through hole communicating with the component space, and the camera module is received in the component space;
wherein the camera module comprises a voice coil motor and a lens, wherein the lens faces the through hole, and the voice coil motor is configured to drive the lens to extend out of or retract into the sliding body through the through hole;
wherein the driving component comprises a motor and a leading screw;
wherein the leading screw comprises a connecting portion, a main body portion, and a first rotating portion that are fixedly connected in order;
wherein the connecting portion is connected to a rotating shaft of the motor, and is driven to rotate by the rotating shaft of the motor;
wherein the sliding body further comprises a sliding portion, a second rotating portion, and a connecting rod;
wherein one end of the connecting rod is fixedly connected to the base member;
wherein the sliding portion and the second rotating portion are arranged on the other end of the connecting rod;
wherein the sliding portion is capable of rotating relative to the connecting rod, the second rotating portion is fixed on the outer side of the connecting rod, and the connecting rod is able to rotate with the second rotating portion;
wherein the second rotating portion is arranged between the base member and the sliding portion;
wherein the sliding portion cooperates with the main body portion;
wherein when the motor drives the leading screw to rotate, the main body portion drives, through the sliding portion, the sliding body to slide, to enable the base member to extend out of the receiving cavity, and the second rotating portion cooperate with the first rotating portion, and the first rotating portion drive the second rotating portion to rotate, to enable the base member to rotate outside the receiving cavity.

8. The camera assembly of claim 7, wherein the motor further comprises a first gear sleeved on the rotating shaft of the motor, and the leading screw further comprises a second gear sleeved on the connecting portion, wherein the second gear meshes with the first gear.

9. The camera assembly of claim 7, wherein the sliding portion comprises a sliding block, and the main body portion is provided with a spiral groove, wherein the sliding block is snapped into the spiral groove;
wherein when the main body portion rotates, the spiral groove rotates with the main body portion, to drive, through the sliding block, the sliding body to slide;
wherein the main body portion is further provided with an arc-shaped groove communicating with an end of the spiral groove facing the first rotating portion;
wherein an extending direction of the arc-shaped groove is perpendicular to a sliding direction of the sliding body;
wherein after the sliding block slides into the arc-shaped groove from the spiral groove, when the arc-shaped groove rotates with the main body portion, the sliding block slides in the arc-shaped groove, to enable the sliding body to stay in place.

10. The camera assembly of claim 9, wherein the base body comprises a limiting portion received in the receiving cavity, wherein the limiting portion is provided with a sliding groove, and the sliding portion further comprises a limiting block slidably received in the sliding groove;
wherein an extending direction of the sliding groove is consistent with the sliding direction of the sliding body.

11. The camera assembly of claim 10, wherein the sliding portion further comprises a collar, and the sliding block and the limiting block are fixed on an outer surface of the collar and opposite each other;
wherein the collar is sleeved on the outer side of the connecting rod and is able to rotate relative to the connecting rod;
wherein the outer side of the connecting rod is provided with an annular groove, and the collar is located in the annular groove.

12. The camera assembly of claim 7, wherein the driving component further comprises a driving block sleeved on the outer side of the leading screw, wherein the driving block is screwed to the leading screw, and is driven to move when the leading screw rotates;
wherein magnetic attraction is generated between the driving block and the sliding portion, and the sliding portion is driven to move when the driving block moves.

13. The camera assembly of claim 12, wherein a gap is defined between the driving block and the sliding portion.

14. The camera assembly of claim 7, wherein the connecting rod is provided with a through hole, wherein the through hole extends along an axial direction of the connecting rod, and communicates with the component space.

15. The camera assembly of claim 7, wherein the first rotating portion is provided with a first friction surface, the second rotating portion is provided with a second friction surface, wherein both the first friction surface and the second friction surface are rough surfaces;
- wherein the second friction surface contacts the first friction surface when the second rotating portion cooperates with the first rotating portion, and static friction force is generated between the first rotating portion and the second rotating portion, to make the second rotating portion be driven rotating by the first rotating portion.

16. The camera assembly of claim 15, wherein the first friction surface is in a shape of a side surface of a circular table, and the second friction surface is in a shape of a side surface of the circular table, wherein an inclination direction of the first friction surface is opposite to that of the second friction surface.

17. The camera assembly of claim 7, wherein the first rotating portion is provided with a first tooth portion, and the second rotating portion is provided with a second tooth portion, wherein the second tooth portion meshes with the first tooth portion when the second rotating portion cooperates with the first rotating portion.

18. A terminal comprising:
a base body being provided with a receiving cavity; and
a camera assembly comprising a driving component, a sliding body, and a camera module;
wherein the driving component and the sliding body are received in the receiving cavity;
wherein the driving component is configured to drive the sliding body moving relative to the base body, to enable the sliding body to extend out of or retract into the receiving cavity;
wherein the sliding body comprises a base member and a cover plate, wherein the cover plate covers the base member and is engaged with the base member to define a component space;
wherein the cover plate is provided with a through hole communicating with the component space, and the camera module is received in the component space;
wherein the camera module comprises a voice coil motor and a lens, wherein the lens faces the through hole, and the voice coil motor is configured to drive the lens to extend out of or retract into the sliding body through the through hole;
wherein the receiving cavity is provided with a receiving opening perpendicular to a sliding direction of the sliding body;
wherein the terminal further comprises a display module, wherein the display module covers the base body and covers the receiving opening.

* * * * *